US012786107B2

(12) United States Patent
Joshi

(10) Patent No.: US 12,786,107 B2
(45) Date of Patent: Nov. 3, 2026

(54) MULTIPATH ROUTING IN A NETWORK DEVICE USING MULTISTAGE COMPARATOR-BASED MODULO CIRCUITS

(71) Applicant: Avago Technologies International Sales Pte. Limited, Singapore (SG)

(72) Inventor: Mandar Joshi, Pleasanton, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 204 days.

(21) Appl. No.: 18/731,005

(22) Filed: May 31, 2024

(65) Prior Publication Data

US 2025/0373540 A1 Dec. 4, 2025

(51) Int. Cl.
*H04L 45/24* (2022.01)
*H04L 47/125* (2022.01)

(52) U.S. Cl.
CPC ............ *H04L 45/24* (2013.01); *H04L 47/125* (2013.01)

(58) Field of Classification Search
CPC .............................. H04L 45/24; H04L 47/125
See application file for complete search history.

(56) References Cited

U.S. PATENT DOCUMENTS 8,149,839 B1 * 4/2012 Hsu ..................... H04L 45/7453 370/392
9,049,137 B1 6/2015 Markine
11,095,552 B1 * 8/2021 Anubolu ............. H04L 49/3009
11,895,015 B1 * 2/2024 Budhia ................... H04L 45/24
2008/0049742 A1 2/2008 Bansal et al.
2016/0328212 A1 11/2016 Rose
2025/0254119 A1 * 8/2025 Toledo .................... H04L 43/50

FOREIGN PATENT DOCUMENTS

EP 1746496 A1 1/2007

OTHER PUBLICATIONS

Extended European Search Report mailed Oct. 9, 2025 in European Patent Application No. 25177958.3, 12 pages.

* cited by examiner

*Primary Examiner* — Tonia L Dollinger
*Assistant Examiner* — Joseph M Cousins
(74) *Attorney, Agent, or Firm* — Kim & Stewart LLP

(57) ABSTRACT

An example apparatus for a network device is described. The apparatus can include: first logic configured to generate first codes for a packet, receive a second code that represents a number of paths through a network between the network device and a destination of the packet; first circuits, coupled to the first logic, each configured to perform a comparison of one of the first codes with the second code and provide an output depending on the comparison; and a second circuit, coupled to the first logic and the first circuits, configured to select the output of one of the first circuits as a third code that represents one of the paths.

14 Claims, 10 Drawing Sheets

500

| REP_VAL (3-bits) | REM (GRP_SZ = 5) | OVERFLOW | |
|---|---|---|---|
| 0 | 0 | false | 502 |
| 1 | 1 | false | |
| 2 | 2 | false | |
| 3 | 3 | false | |
| 4 | 4 | false | |
| 5 | 0 | true | 504 |
| 6 | 1 | true | |
| 7 | 2 | true | |

700

REP_VAL_1

| | | 0 | 1 | 2 | 3 | 4 | 5 | 6 | 7 |
|---|---|---|---|---|---|---|---|---|---|
| | | OVERFLOW = false | | | | | OVERFLOW = true | | |
| REP_VAL_2 | 0 | 0 | 1 | 2 | 3 | 4 | 0 | 0 | 0 |
| | 1 | 0 | 1 | 2 | 3 | 4 | 1 | 1 | 1 |
| | 2 | 0 | 1 | 2 | 3 | 4 | 2 | 2 | 2 |
| | 3 | 0 | 1 | 2 | 3 | 4 | 3 | 3 | 3 |
| | 4 | 0 | 1 | 2 | 3 | 4 | 4 | 4 | 4 |
| | 5 | 0 | 1 | 2 | 3 | 4 | 0 | 0 | 0 |
| | 6 | 0 | 1 | 2 | 3 | 4 | 1 | 1 | 1 |
| | 7 | 0 | 1 | 2 | 3 | 4 | 2 | 2 | 2 |

702

704

FIG. 7

900

| Group Size | Imbalance with int_div (%) | Imbalance with Modulo Circuit Stages | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| **5** | 0.002 | 37.5 | 14.063 | 5.273 | 1.978 | 0.742 | 0.278 | 0.104 | 0.039 | 0.015 | 0.005 | 0.002 | 0.001 |
| **9** | 0.011 | 43.750 | 19.141 | 8.374 | 3.664 | 1.603 | 0.701 | 0.307 | 0.134 | 0.059 | 0.026 | 0.011 | 0.005 |
| **17** | 0.002 | 46.875 | 21.973 | 10.300 | 4.828 | 2.263 | 1.061 | 0.497 | 0.233 | 0.109 | 0.051 | 0.024 | 0.011 |
| **33** | 0.047 | 48.438 | 23.462 | 11.364 | 5.505 | 2.666 | 1.291 | 0.626 | 0.303 | 0.147 | 0.071 | 0.034 | 0.017 |
| **65** | 0.024 | 49.219 | 24.225 | 11.923 | 5.868 | 2.888 | 1.422 | 0.700 | 0.344 | 0.170 | 0.083 | 0.041 | 0.020 |
| **129** | 0.006 | 49.609 | 24.611 | 12.209 | 6.057 | 3.005 | 1.491 | 0.740 | 0.367 | 0.182 | 0.090 | 0.045 | 0.022 |
| **257** | 0.002 | 49.805 | 24.805 | 12.354 | 6.153 | 3.064 | 1.526 | 0.760 | 0.379 | 0.189 | 0.094 | 0.047 | 0.023 |
| **513** | 0.587 | 49.902 | 24.902 | 12.427 | 6.201 | 3.095 | 1.544 | 0.771 | 0.385 | 0.192 | 0.096 | 0.048 | 0.024 |
| **1025** | 1.466 | 49.951 | 24.951 | 12.463 | 6.226 | 3.110 | 1.553 | 0.776 | 0.388 | 0.194 | 0.097 | 0.048 | 0.024 |
| **2049** | 3.078 | 49.976 | 24.976 | 12.482 | 6.238 | 3.117 | 1.558 | 0.779 | 0.389 | 0.194 | 0.097 | 0.049 | 0.024 |

FIG. 9

MULTIPATH ROUTING IN A NETWORK DEVICE USING MULTISTAGE COMPARATOR-BASED MODULO CIRCUITS

BACKGROUND

Multipath routing can be a feature of a network device, such as a router, switch, bridge, etc., which allows network traffic from a source to a destination to be split across multiple paths. Network devices that do not support multipath routing may only remember a single path through the network to any given destination. Network devices that support multipath routing, on the other hand, can select a route out of many through the network to a given destination. Multipath routing can allow a network device to balance network traffic across multiple paths through the network. A network device can implement various types of multipath routing, such as equal-cost multipath (ECMP) routing, flow-based multipath routing, packet-based multipath routing, source-based multipath routing, destination-based multipath routing, and the like known in the art.

In one technique for multipath routing, a network device may generate values representative of the network traffic to be routed. The network device can generate the representative values based on some indicia of the network traffic. For example, a network device can generate representative values from data in headers of packets (e.g., source and destination addresses, source and destination ports, flow identifiers, etc.). In this manner, the network device can classify packets in the network traffic based on representative values. Further, the network device can obtain a group value associated with the network traffic. The group value can define a number of available paths for routing the network traffic. The network device can then assign packets to paths by performing modulo arithmetic, e.g., performing integer division and taking the remainder. The network device can perform integer division of the representative values by the group value to obtain remainder values. The network device can use the remainder values as identifiers for paths.

To process packets efficiently, a network device may perform multipath routing operations using circuits dedicated for such purposes (e.g., as opposed to using software executing on a processor). For example, a network device can include circuits for performing modulo arithmetic. However, circuits that perform modulo arithmetic (e.g., integer division and remainder determination) can be expensive to perform in terms of signal timing and integrated circuit (IC) implementation area. Such circuits can also be difficult to scale up to higher group values (e.g., higher numbers of paths).

SUMMARY

In an embodiment, an apparatus for a network device is described. The apparatus can include first logic configured to generate first codes for a packet, receive a second code that represents a number of paths through a network between the network device and a destination of the packet. The apparatus can include first circuits, coupled to the first logic, each configured to perform a comparison of one of the first codes with the second code and provide an output depending on the comparison. The apparatus can include a second circuit, coupled to the first logic and the first circuits, configured to select the output of one of the first circuits as a third code that represents one of the paths.

In an embodiment, a network device is described. The network device can include a packet processor configured to receive a packet. The network device can include first logic, coupled to the packet processor, configured to generate first codes for the packet, receive from a memory a second code that represents a number of paths through a network between the network device and a destination, and provide a third code that represents one of the paths to the packet processor. The network device can include first circuits, coupled to the first logic, each configured to perform a comparison of one of the first codes with the second code and provide an output depending on the comparison. The network device can include a second circuit, coupled to the first logic and the first circuits, configured to select the output of one of the first circuits as the third code.

In an embodiment, a method of routing a packet in a network device is described. The method can include generating, at first logic, first codes for the packet. The method can include receiving, at the first logic from a memory, a second code that represents a number of paths through a network between the network device and a destination. The method can include performing, by first circuits, comparisons of the first codes with the second code and generate outputs in response to the comparisons, each of the outputs being a selection of one of the first codes or another code. The method can include selecting, by a second circuit, one of the outputs as a third code that represents one of the paths. The method can include routing, by a packet processor, the packet based on the third code.

BRIEF DESCRIPTION OF THE DRAWINGS

FIG. 7 is a table illustrating operation of a path index generator having two stages according to some embodiments.

FIG. 9 is a table illustrating imbalance of integer division-based modulo versus a path index generator for various example group sizes according to some embodiments.

DETAILED DESCRIPTION

Multipath routing in a network device using multistage comparator-based modulo circuits is described. In some embodiments, a network device includes a packet processor configured to route packets to network destinations. The topology of the network can be such that there are multiple alternative paths between the network device and each network destination. The packet processor can perform multipath routing for each packet or set of packets. The multipath routing process can include a path selection function where, for a packet or set of packets being routed, a path is chosen from a set of alternative paths. The network device can include a multipath load balancer configured to select paths from sets of paths on behalf of the packet processor. The multipath load balancer can balance the packets being routed to a network destination across the alternative paths using a modulo function to select the paths. The modulo function can be implemented by a path index generator comprising combinational digital logic. The combinational digital logic includes a set of first circuits that can be modulo circuits and a second circuit that can be a set of multiplexers coupled to outputs of the modulo circuits. The inputs of the modulo circuits can receive the operands, which can be representative values for the packet(s) and a group size value representing a number of alternative paths. Each modulo circuit can include a comparator that compares its input operands and combinational logic that emulates a modulo operation based on output of the comparator. The implementation of a modulo function described herein that uses combinational logic can be more efficient in terms of timing and IC implementation area than integer division and remainder determination and can scale more efficiently for increasing numbers of alternative paths. These and further aspects of the embodiments are described below with respect to the drawings.

Figure 1:
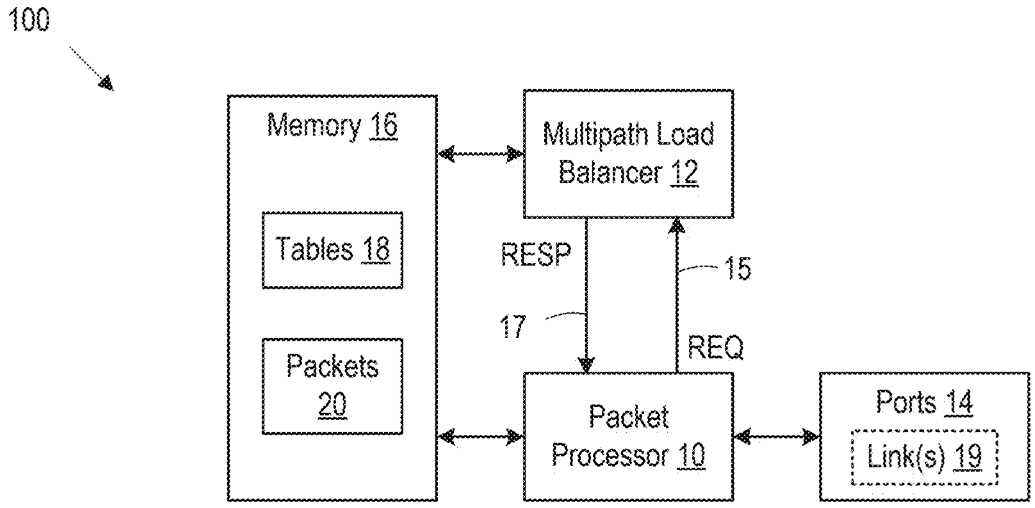
FIG. 1 is a block diagram depicting a network device according to some embodiments.

FIG. 1 is a block diagram depicting a network device 100 according to some embodiments. A network device may be a device that enables information exchange on a computer network. The information can be exchanged using packets, where a packet may be a unit of data transmitted across the computer network. In embodiments, a packet may be a protocol data unit (PDU) of Layer 3 of the Open Systems Interconnection (OSI) model known in the art (also referred to as an Internet Protocol (IP) packet). As is well-known in the art, OSI Layer 3 (also referred to as the network layer) is the layer that enables addressing, routing, and traffic control in a network. A packet can include a header and a payload, where the payload may be data to be delivered and the header may be data preceding the payload that enables delivery of the payload. Example network devices include switches, routers, bridges, gateways, access points, and the like.

Network device 100 includes a packet processor 10, a multipath load balancer 12, ports 14, and a memory 16. A packet processor may be logic that processes packets. Packet processor 10 can be implemented using specific-purpose digital logic, a general-purpose processor executing software, or a combination of both. Specific-purpose digital logic may be a circuit that represents and manipulates discrete data ("digital data") and that is customized for a particular use (e.g., packet processing) rather than general-purpose use. A general-purpose processor may be a circuit designed for the general-purpose use of executing software. As used herein, specific-purpose digital logic does not encompass a general-purpose processor executing software but rather only circuit(s) (e.g., logic gates, multiplexers, etc.). For purposes of clarity, the term "digital logic" as used hereafter means specific-purpose digital logic unless otherwise indicated. As used herein, the term "logic" by itself (without a modifier or without modifying another term) can encompass either digital logic, a general-purpose processor executing software, or both. In embodiments, one use of packet processor 10 may be to route packets in cooperation with multipath load balancer 12 as described further herein.

A port may be a circuit or software-defined entity (e.g., a logical port) through which a network device connects to another device, such as another network device. Network device 100 can include ports 14 connected to other devices, including other network devices. A link may be a group of ports aggregated together (e.g., a link aggregation group (LAG)). Network device 100 can organize some ports 14 into link(s) 19. Packet processor 10 can communicate with ports 14 and link(s) 19 (if any). A memory may be a circuit that stores data, such as dynamic random-access memory (DRAM), static random-access memory (SRAM), and the like known in the art. Memory 16 can include one or more memory circuits (e.g., DRAM, SRAM, etc.). Memory 16 can be coupled to packet processor 10 and multipath load balancer 12. Memory 16 can store tables 18 and packets 20. A table may be a set of relational data (e.g., data organized into rows and columns).

Multipath load balancer 12 may be a circuit that receives requests and supplies data indicative of paths, selected from multiple paths in response to the requests, having an approximately uniform distribution within a selected precision. In some embodiments, multipath load balancer 12 may include multiple stages, where the number of stages can dictate the precision to which the distribution of the selected paths is uniform (e.g., the precision to which the paths are equally selected from the multiple paths). Multipath load balancer 12 can be coupled to packet processor 10. A path may be a connection between network devices that may include zero or more intermediate network devices. Data indicative of a path may be a code that represents a path. A code can be an integer (e.g., three paths can be represented by integers 0, 1, and 2). Within digital logic, a code can be conveyed as a binary code. The digital logic described herein can operate using various codes that can be identified by adjectives (e.g., REP_VAL codes, GRP_SZ codes, REM codes, etc.) or by number (e.g., first codes, second code, third code, etc.). Packet processor 10 can use a code supplied by multipath load balancer 12 as an index in a table to identify a path. Thus, a code supplied by multipath load balancer 12 may be referred to as a path index. Multipath load balancer 12 can include digital logic configured to perform load-balanced path selection, as described further below.

In operation, network device 100 can receive packets from the network. Network device 100 can store the packets as packets 20 in memory 16. For example, packet processor 10 (or some other component of network device 100 not shown) can receive packets through ports 14 and store packets 20 in memory 16.

Network device 100 can send packets to other network devices on the network. Packet processor 10 can read packets 20 to be transmitted from memory 16. Packet processor 10 can route each packet to be transmitted. Routing and its derivative terms may be the process of determining a path that a packet or set of packets takes through the network (e.g., from network device 100 to another network device referred to as herein as the network destination). Packet processor 10 can perform routing with the assistance of routing tables. A routing table may be a table 18 stored in memory 16 that lists routes to various network destinations. A route in the routing table may be a path described by, for example, an IP address of the network destination, an IP address of the next hop (next network device on the route), a number of hops on the path, and a cost metric associated with the path. Network device 100 can be configured with static routes and can learn routes in the routing table dynamically using a routing protocol, as is known in the art. For a given network destination, the routing table can include multiple possible paths for the packet(s) being routed. Packet processor 10 can cooperate with multipath load balancer 12 to balance the packets being sent to a network destination across multiple paths to the network destination.

Packet processor 10 can send path index requests (REQ) to multipath load balancer 12 via an interface 15. An interface may be a connection between components over which the components can interact (e.g., send data to and receive data from). A path index request may be a request for a path, identified by a path index, for a packet or set of packets having multiple alternative paths to a network destination. Multipath load balancer 12 can return path index responses (RESP) to packet processor 10 via an interface 17. A path index response may be a response to a path index request that includes a path index for a selected path. Packet processor 10 can use a path index to determine path information from one or more tables 18 when routing a packet or packet(s) to a network destination over a selected path (e.g., to which port 14 or link 19 the packet(s) should be forwarded for the selected path).

Figure 2:
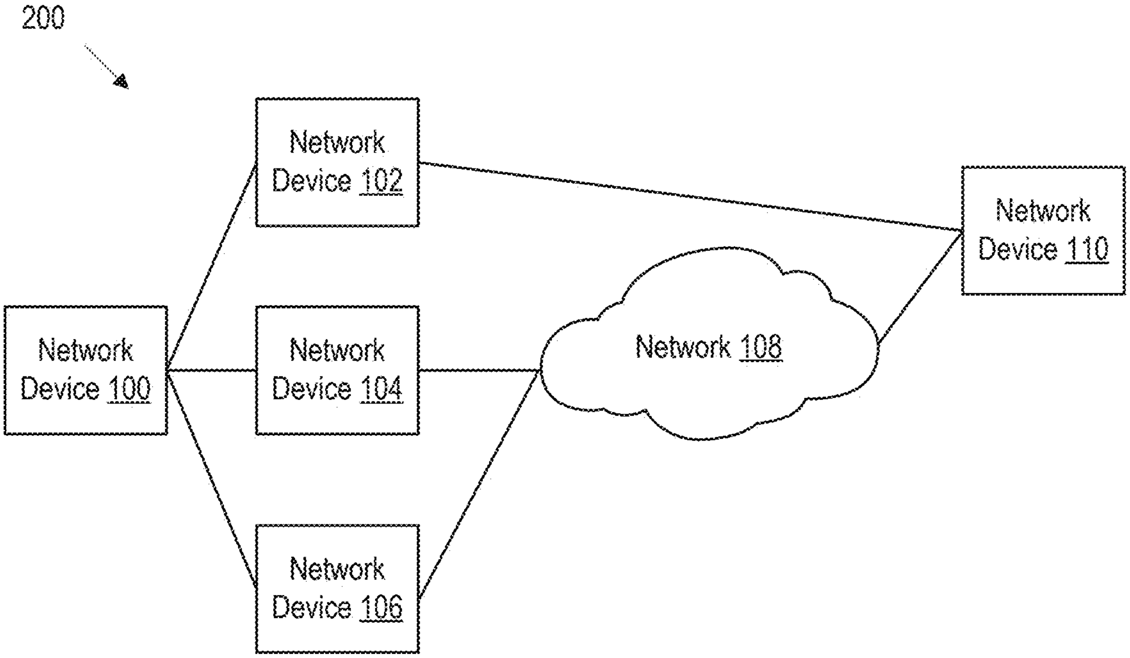
FIG. 2 is a block diagram depicting a network device topology according to some embodiments.

FIG. 2 is a block diagram depicting a network device topology 200 according to some embodiments. Network device topology 200 includes network device 100 that may be connected to network devices 102, 104, and 106. Network device 102 may be connected to network device 110. Network device 104 may be connected to network device 110 through a network 108 (e.g., through one or more network devices of network 108). Network device 106 may be connected to network device 110 through network 108 (e.g., through one or more network devices of network 108). In an example, network device 110 comprises a network destination for packets being routed by network device 100. Network device 100 can include a routing table that defines paths to network device 110, including: (1) a path from network device 102 to network device 110; (2) a path from network device 104 through network 108 to network device 110 (e.g., through one or more hops in network 108); and (3) a path from network device 106 through network 108 to network device 110 (e.g., through one or more hops in network 108). The paths comprise a set of alternative paths for packets being routed by network device 100 to network device 110. Network device 100 can associate each of the alternative paths with a path index. Network device 100 can associate each path index with a port or link to the first hop of the respective path. Network device 100 can perform path selection using multipath load balancer 12, as described further herein.

Figure 3:
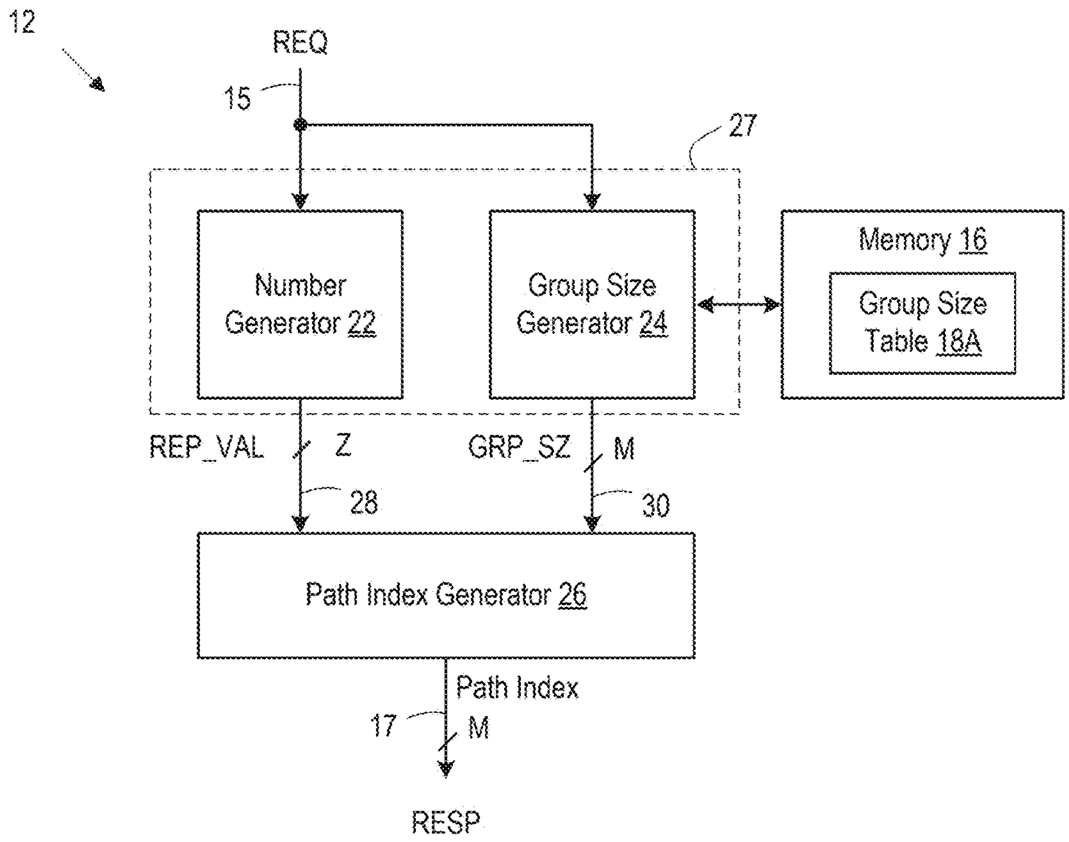
FIG. 3 is a block diagram depicting a multipath load balancer according to some embodiments.

FIG. 3 is a block diagram depicting multipath load balancer 12 according to some embodiments. In embodiments, multipath load balancer 12 may include a data converter 27 coupled to a path index generator 26. A data converter may be logic configured to receive data as input and supply data generated as output, which may include a transformation of at least a portion of the input data. Data converter 27 can receive as input requests (REQ) from packet processor 10. Data converter 27 can include functions comprising a number generator 22 and a group size generator 24. Number generator 22 can receive first input data from a request on interface 15 and generate a representative value (REP_VAL) as output on an interface 28. For example, the first input data can be, for example, all or a portion of a header of a packet and number generator 22 can implement a hash function that generates a hash value from the first input data. The hash value can be output as the representative value (REP_VAL). In another example, number generator 22 can be a random number generator or a pseudorandom number generator and the first input data can be a seed value or other data used to trigger generation of a random number or pseudorandom number. The random number or pseudorandom number can be output as the representative value (REP_VAL). In this manner, the representative value (REP_VAL) can be a value that represents or is otherwise associated with a packet or set of packets being routed. Number generator 22 can supply representative values (REP_VAL) on interface 28 as Z-bit binary values, where Z is a positive integer the value of which is discussed below.

Group size generator 24 can receive second input data from a request on interface 15 and generate a group size (GRP_SZ) as output on an interface 30. For example, the second input data can be an IP address of a network destination for packet(s) being routed. Group size generator 24 can obtain a group size from a group size table 18A store in memory 16 based on the second input data (e.g., a network destination IP address). A group size may be a value representing a number of alternative paths for routing the packet(s). Network device 100 can maintain group sizes for different network destinations in group size table 18A that depend on the number of alternative paths to the network destinations. Group size generator 24 can supply group sizes (GRP_SZ) on interface 30 as M-bit binary values, where M is a positive integer. The value Z for the number of bits in REP_VAL can be a multiple of M, as discussed further below.

Data converter 27 can be implemented as digital logic, software executing on a general-purpose processor, or a combination of both. As shown, data converter 27 can be part of multipath load balancer 12. In other embodiments, all or a portion of data converter 27 can be implemented by packet processor 10 (e.g., number generator 22, group size generator 24, or both can be implemented by packet processor 10). Thus, each request (REQ) on interface 15 can include the first and second data used to generate REP_VAL and GRP_SZ (as described above), the first data used to generate REP_VAL and GRP_SZ supplied by packet processor 10, REP_VAL supplied by packet processor 10 and the second data used to generate GRP_SZ, or both REP_VAL and GRP_SZ supplied by packet processor 10.

Path index generator 26 may be digital logic configured to receive REP_VAL and GRP_SZ and generate a path index in response thereto. Path index generator 26 can be coupled to data converter 27 via interfaces 28 and 30. Alternatively, path index generator 26 can receive REP_VAL, GRP_SZ, or both from packet processor 10 via the request (REQ) (e.g., depending on whether all or a portion of data converter 27 is implemented by packet processor 10). Path index generator 26 can be coupled to interface 17 to supply the path indices as M-bit binary values in responses (RESP) to packet processor 10.

Figure 4:
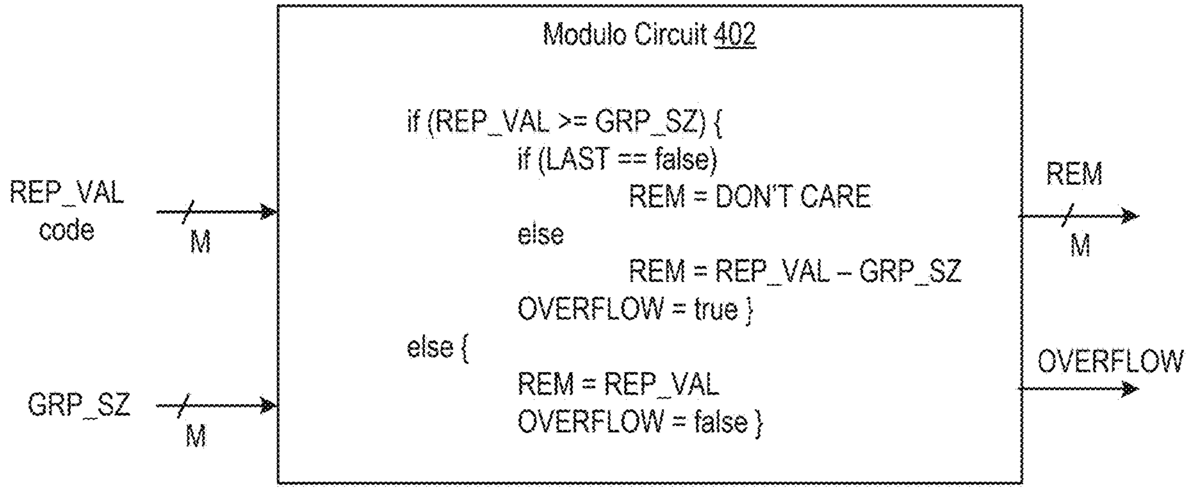
FIG. 4 is a block diagram depicting a modulo circuit according to some embodiments.

FIG. 4 is a block diagram depicting a modulo circuit 402 according to some embodiments. A modulo operation may be an operation that returns the remainder of an integer division. Given two positive integers a and n, a modulo n (e.g., a mod n) is the remainder of the integer division of a by n, where a is the dividend and n is the divisor. Modulo circuit 402 receives as input an M-bit REP_VAL code and an M-bit GRP_SZ code and generates an M-bit remainder (REM) code as output. As discussed above, digital logic that performs integer division and remainder determination can be expensive to perform in terms of signal timing and integrated circuit (IC) implementation area. Such circuits can also be difficult to scale up to larger group sizes. Thus, in embodiments, modulo circuit 402 emulates the integer devising and remainder determination using the following procedure: (1) if REP_VAL as determined from the REP_VAL code is greater than or equal to GRP_SZ as determined from the GRP_SZ code, then (a) REM is set equal to a "don't care" code if a Boolean LAST is false; (b) REM is set to the difference between REP_VAL and GRP_SZ if LAST is true; and (c) a Boolean OVERFLOW value is set to true; or (2) if REP_VAL is less than GRP_SZ, then: (a) REM is set equal to REP_VAL and (b) OVERFLOW is set to false. As discussed further below, instances of modulo circuit 402 can be chained together in a multi-stage modulo circuit. One of the instances can be designated as the "last" instance in the chain, in which case LAST can be true. For all other instances of modulo circuit 402 in the chain, LAST can be false.

Thus, if REP_VAL is less than GRP_SZ, the remainer (REM) can be REP_VAL itself. If, however, REP_VAL is greater than or equal to GRP_SZ, the remainder (REM) can be another code, which can be a "don't care" code, in case LAST is false or the difference between REP_VAL and GRP_SZ if LAST is true. The value of OVERFLOW dictates which condition of the initial comparison was satisfied (e.g., false if REP_VAL<GRP_SZ and true otherwise). A "don't care" code may be any code. When the value of OVERFLOW is true, this can indicate that the value of REM can be ignored. When LAST is true, the values REP_VAL and GRP_SZ can be constrained such that the integer division of REP_VAL by GRP_SZ is less than two. Modulo circuit 402 can also supply OVERFLOW as output.

Figures 5, 6:
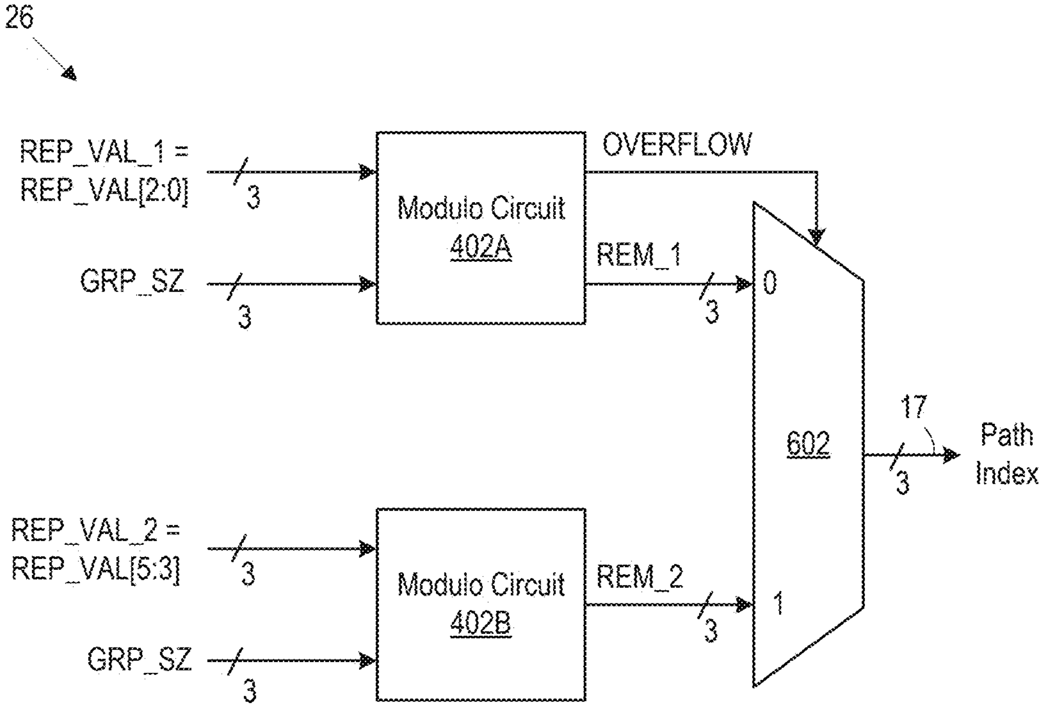
FIG. 5 is a table illustrating operation of a modulo circuit according to some embodiments.
FIG. 6 is a block diagram depicting a path index generator according to some embodiments.

FIG. 5 is a table 500 illustrating operation of modulo circuit 402 according to some embodiments. In the example, the group size (GRP_SZ) can be set to a constant value of five (e.g., GRP_SZ=5 alternative paths to select from). In the example, M=3 bits such that REP_VAL can range between 0 and 7. In the example, LAST is set to true (e.g., modulo circuit 402 is the only instance and thus the last instance). Table 500 shows the remainder (REM) for each value of REP_VAL between 0 and 7. For REP_VAL between 0 and 4, REM is equal to REP_VAL and OVERFLOW is false. For REP_VAL between 5 and 7, REM is equal to REP_VAL-5 and OVERFLOW is set to true. The remainder (REM) can be a path index. As can be seen by table 500, path indices 3 and 4 are utilized only half as much as path indices 0, 1, and 2. Table 500 includes a balanced region 502 and an imbalanced region 504. In the example of a single modulo circuit 402, balanced region 502 corresponds to when OVERFLOW is false and imbalanced region 504 corresponds to when OVERFLOW is true. Path indices 0, 1, 2, 3, and 4 have a distribution of 2, 2, 2, 1, 1, respectively, and thus a single modulo circuit 402 exhibits an imbalance of 2:1 and the probability of REP_VAL falling into imbalanced region 504 is 3/8. The precision of uniformity in the distribution can be expressed as the probability of the representative value falling into the imbalanced region (e.g., 37.5% in the case of one modulo circuit 402, a group size of five, and a three-bit representative value). An ideally uniform distribution would have such a probability equal to zero (e.g., no imbalanced region). Thus, an increase in the precision of uniformity in the distribution means a reduction in the probability of the representative value falling into the imbalanced region.

FIG. 6 is a block diagram depicting path index generator 26 according to some embodiments. Path index generator 26 can include a modulo circuit 402A, a modulo circuit 402B, and a multiplexer 602. Modulo circuit 402A can include inputs to receive a code REP_VAL_1 and GRP_SZ. Modulo circuit 402B can include inputs to receive a code REP_VAL_2 and GRP_SZ. The inputs of each of modulo circuits 402A and 402B can supply 3-bit codes in the example (e.g., M=3). In embodiments, REP_VAL_1 may be a code comprising a portion of REP_VAL on interface 28 (e.g., REP_VAL [2:0] being the first three bits of REP_VAL [Z−1:0]). REP_VAL_2 may be a code comprising another portion of REP_VAL on interface 28 (e.g., REP_VAL [5:3]). Modulo circuits 402A and 402B receive a group size code from interface 30 (e.g., GRP_SZ). Multiplexer 602 includes two data inputs and a control input. A multiplexer may be a circuit configured to select one of its data inputs as an output based on the control input. Multiplexer 602 can include a data input (designated as data input 0) coupled to an output of modulo circuit 402A that supplies its remainder (REM_1). Multiplexer 602 can include a data input (designated as data input 1) coupled to an output of modulo circuit 402B that supplies its remainder (REM_2). Each of the remainders REM_1 and REM_2 can be 3-bit codes in the example of M=3. A control input of multiplexer 602 can be coupled to an output of modulo circuit 402A that supplies OVERFLOW. The OVERFLOW output of modulo circuit 402B can be unconnected (not shown) or not generated. An output of multiplexer 602 can be coupled to interface 17 to supply a path index (e.g., a three-bit path index in the example).

In operation, modulo circuit 402A can include digital logic to implement an instance of modulo circuit 402 where LAST is fixed to false. Modulo circuit 402B can include digital logic to implement an instance of modulo circuit 402 where LAST is fixed to true. That is, modulo circuits 402A and 402B can include variations in their digital logic implementation. Example digital logic implementations of modulo circuits 402A and 402B are discussed below with respect to FIGS. 10A and 10B. Modulo circuit 402A can function as described above for modulo circuit 402 with LAST being fixed to false. Modulo circuit 402B can function as described above for modulo circuit 402 with LAST being fixed to true.

The value of OVERFLOW from modulo circuit 402A can control which of REM_1 and REM_2 is selected by multiplexer 602 as output. When OVERFLOW from modulo circuit 402A is false, multiplexer 602 can select REM_1 from modulo circuit 402A as output for the path index. When OVERFLOW from modulo circuit 402A is true, multiplexer 602 can select REM_2 from modulo circuit 402B as output from the path index.

FIG. 7 is a table 700 illustrating operation of path index generator 26 having two stages according to some embodiments. As shown in FIG. 6, path index generator 26 can include two instances of modulo circuit 402 (e.g., modulo circuits 402A and 402B). In such an embodiment, path index generator 26 may be referred to herein as having two stages corresponding to the two modulo circuits. In the example of table 700, the group size is five (e.g., GRP_SZ=5) and each of REP_VAL_1 and REP_VAL_2 is three-bits. REP_VAL_1 is represented on the horizontal axis of table 700 and ranges from 0 to 7. REP_VAL_2 is represented on the vertical axis of table 700 and ranges from 0 to 7. Between values 0 and 4 of REP_VAL_1, OVERFLOW from modulo circuit 402A is false. Between values 5 and 7 of REP_VAL_1, OVERFLOW from modulo circuit 402A is true. The interior of table 700 shows the path index value output by multiplexer 602. In the two-stage example, table 700 includes a balanced region 702 and an imbalanced region 704. Together, REP_VAL_1 and REP_VAL_2 have 64 code points. As shown in table 700, 53 out of 64 code points are in balanced region 702 and 11 out of 64 code points are in imbalanced region 704. A code point falls into imbalanced region 704 when the OVERFLOW condition of both modulo circuits 402A and 402B is true. Path indices 0, 1, 2, 3, and 4 have a distribution of 14, 14, 14, 11, and 11 (e.g., path indices 0, 1, and 2 appear 14 times each and path indices 3 and 4 appear 11 times each). Comparing two stages to a single stage (table 500 in FIG. 5), the imbalance has gone down from 2:1 to 14:11. The probability of a representative value falling into the imbalanced region has fallen from 3/8 for a single stage to 9/64 for two stages.

Figure 8:
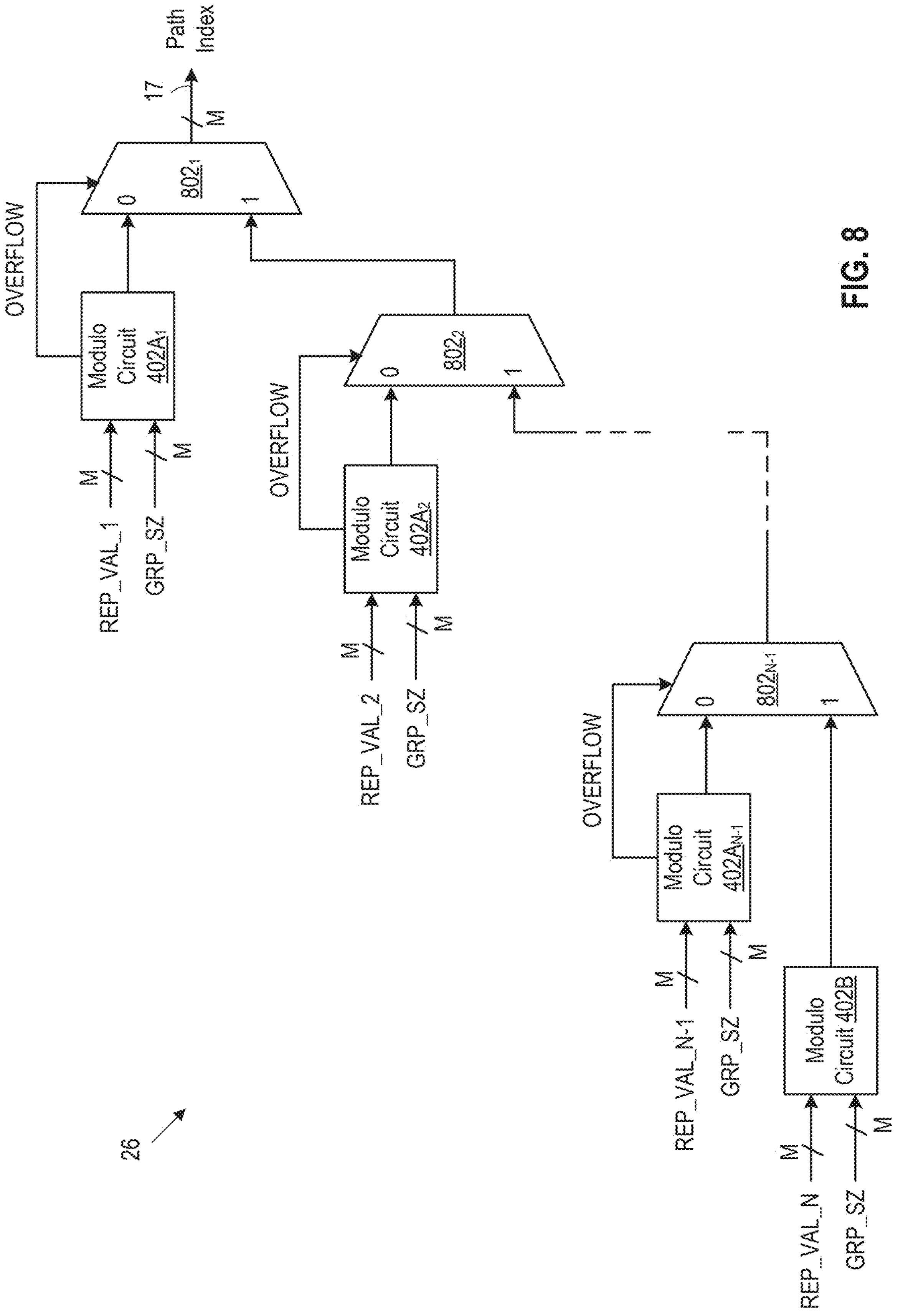
FIG. 8 is a block diagram depicting a path index generator according to some embodiments.

FIG. 8 is a block diagram depicting path index generator 26 according to some embodiments. As shown in FIG. 8, path index generator 26 may include N stages where N is an integer greater than one. Path index generator 26 can include N modulo circuits 402$A_1$ . . . 402$A_{N-1}$ and 402B. The instances of modulo circuit 402A and 402B are discussed above with respect to FIG. 6. Path index generator 26 can include N−1 multiplexers $\mathbf{802}_1$ . . . $\mathbf{802}_{N-1}$. Outputs of modulo circuits 402$A_1$ . . . 402$A_{N-1}$ can be coupled to first data inputs (0) of multiplexers $\mathbf{802}_1$ . . . $\mathbf{802}_{N-1}$, respectively. For a kth multiplexer 802*k* (k=∈[1 . . . . N−2]), the second data input (1) can be coupled to the output of multiplexer 802*k*+1. The second data input (1) of multiplexer $\mathbf{802}_{N-1}$ can be coupled to the output of modulo circuit 402B. That is, multiplexer $\mathbf{802}_{N-1}$ can be coupled to a pair of the modulo circuits (e.g., modulo circuit 402$A_{N-1}$ and modulo circuit 402B). The first data input (0) of multiplexer $\mathbf{802}_{N-1}$ can be coupled to the output of a first one of the pair of modulo circuits (e.g., modulo circuit 402$A_{N-1}$) and the second data input (1) of multiplexer $\mathbf{802}_{N-1}$ can be coupled to the output of a second one of the pair of modulo circuits (e.g., modulo circuit 402B). The output of multiplexer $\mathbf{802}_1$ can be coupled to interface 17 to provide the M-bit path index. The OVERFLOW outputs of modulo circuits 402$A_1$ . . . 402$A_{N-1}$ can be coupled to the control inputs of multiplexers $\mathbf{802}_1$ . . . $\mathbf{802}_{N-1}$, respectively. First inputs of modulo circuits 402$A_1$ . . . 402$A_{N-1}$ can receive codes REP_VAL_1 . . . . REP_VAL_N−1. A first input of modulo circuit 402B can receive a code REP_VAL_N. The codes REP_VAL_1 . . . . REP_VAL_N can be derived from REP_VAL on interface 28. Thus, in an example, the bit width of interface 28 can be Z=N*M. Second inputs of modulo circuits 402$A_1$ . . . 402$A_N$ can each receive GRP_SZ from interface 30. A second input of modulo circuit 402B can receive GRP_SZ from interface 30.

FIG. 9 is a table 900 illustrating imbalance of integer division-based modulo versus path index generator 26 for various example group sizes according to some embodiments. The data for table 900 can be generated from a simulation using ten million random numbers for representative values for each group size. Distributions can be determined using an integer division and remainder determination algorithm and using path index generator 26 having multiple stages (e.g., 1-12 stages). The data shown in table 900 is representative of the data produced by such a simulation. As shown in table 900, the imbalance exhibited by path index generator 26 reduces as more stages are used (e.g., as Nis increased). As shown, the imbalance using 12 stages is less than the imbalance of integer division with remainder determination. For group values greater than 1024, table 900 illustrates that the imbalance using 7 or more stages is less than the imbalance of integer division with remainder determination. The precision of uniformity of the distribution in the selected paths can be controlled by the number of stages used in path index generator 26.

Figure 10A:
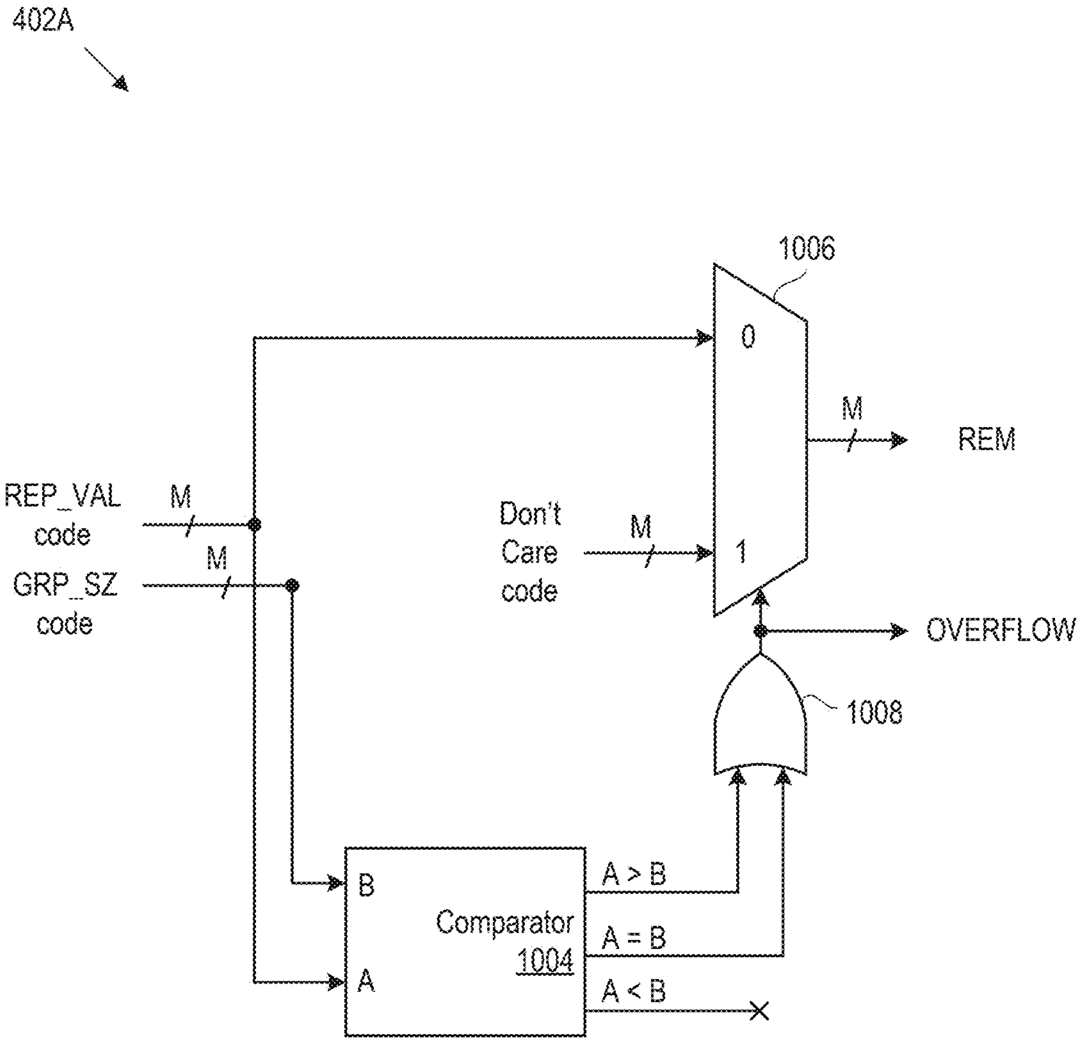
FIG. 10A is a block diagram depicting a modulo circuit according to some embodiments.

FIG. 10A is a block diagram depicting a modulo circuit 402A according to some embodiments. As discussed above, modulo circuit 402A is an instance of modulo circuit 402 where LAST is fixed to false. There is no need for a signal LAST or any digital logic to process such a signal. Modulo circuit 402A and each instance of modulo circuit 402$A_1$ . . . 402$A_{N-1}$ can be implemented using digital logic. In embodiments, the digital logic of each modulo circuit can be combinational digital logic. Combinational digital logic can be a type of digital logic where output(s) are directly related to the current combination of input(s). In the example of FIG. 10A, modulo circuit 402A can include a comparator 1004, a multiplexer 1006, and a logical OR gate 1008. Multiplexer 1006 can include a first data input (0) coupled to receive the REP_VAL code and a second data input (1) coupled to receive another code (e.g., a "don't care" code). The output of multiplexer 1006 supplies an M-bit remainder (REM) code.

A comparator may be combinational digital logic (also referred to as combinational logic) that compares two inputs (A) and (B) and generates output(s) being result(s) of the comparison. Comparator 1004 can include a first input (A) coupled to receive the REP_VAL code and a second input (B) coupled to receive the GRP_SZ code. Comparator 1004 can include an output indicating whether A is greater than B; an output indicating whether A equals B; and an output indicating whether A is less than B. Comparator 1004 can be realized by cascading magnitude comparators, for example. In the example, the output (A<B) can be coupled to a first input of logical OR gate 1008 and the output (A=B) can be coupled to a second input of logical OR gate 1008. The output of logical OR gate 1008 can be coupled to the control input of multiplexer 1006. The output of logical OR gate 1008 also supplies OVERFLOW. The output (A<B) of comparator 1004 can be unconnected. Thus, when REP_VAL code is greater than or equal to GRP_SZ code, OVERFLOW is true and multiplexer 1006 selects data input (1), which is the don't care code. When REP_VAL code is less than, GRP_SZ code, OVERFLOW is false and multiplexer selects data input (0), which is REP_VAL code. The combinational digital logic shown in FIG. 10A is illustrative and meant to mirror the function of modulo circuit 402A. Those skilled in the art will appreciate that the function of modulo circuit 402A can be implemented using various combinational digital logic structures that are variations of that shown in FIG. 10A. For example, logical OR gate 1008 can be omitted. In pace of logical OR gate 1008, modulo circuit 402A can include an inverter (logical NOT gate) having an input coupled to the (A<B) output and an output coupled to the control input of the multiplexer 1006 and providing OVERFLOW.

Figure 10B:
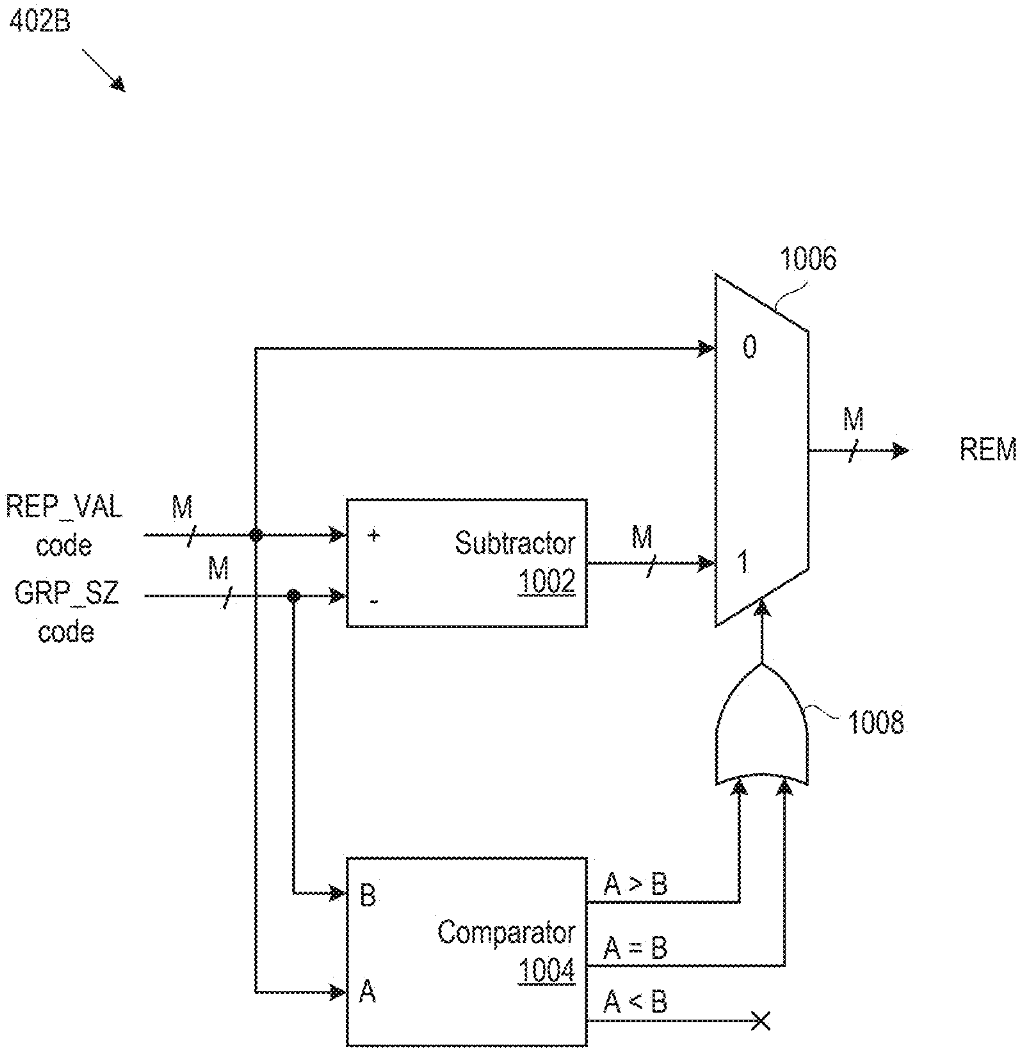
FIG. 10B is a block diagram depicting a modulo circuit according to other embodiments.

FIG. 10B is a block diagram depicting a modulo circuit 402B according to some embodiments. As discussed above, modulo circuit 402B is an instance of modulo circuit 402 where LAST is fixed to true. There is no need for a signal LAST or any digital logic to process such a signal. Elements of FIG. 10B that are the same or similar to those of FIG. 10A are discussed above. The difference between implementations of modulo circuit 402A and 402B can be that modulo circuit 402B include a subtractor 1002 coupled to the second input (1) of multiplexer 1006 rather than a "don't care" code. A subtractor may be combinational digital logic that outputs a difference between two values. Subtractor 1002 includes an input (+) for the minuend, which can be an M-bit REP_VAL code, and an input (−) for the subtrahend, which can be an M-bit GRP_SZ code. Subtractor 1002 can be realized using various implementations, such as a parallel binary subtractor or a parallel binary adder that sums the REP_VAL code with a 2's complement of the GRP_SZ code. Thus, when REP_VAL code is greater than or equal to GRP_SZ code, the output of logical OR gate 1008 is true and multiplexer 1006 selects data input (1), which is the difference output of subtractor 1002 (e.g., REP_VAL code-GRP_SZ code). When REP_VAL code is less than the GRP_SZ code, the output of logical OR gate 1008 is false and multiplexer selects data input (0), which is REP_VAL code. The output of logical OR gate 1008 in modulo circuit 402B, which is OVERFLOW in modulo circuit 402A, can remain internal in modulo circuit 402B. The combinational digital logic shown in FIG. 10B is illustrative and meant to mirror the function of modulo circuit 402 when LAST is true. Those skilled in the art will appreciate that the function of modulo circuit 402B can be implemented using various combinational digital logic structures that are variations of that shown in FIG. 10B. For example, logical OR gate 1008 can be omitted. In pace of logical OR gate 1008, modulo circuit 402B can include an inverter (logical NOT gate) having an input coupled to the (A<B) output and an output coupled to the control input of the multiplexer 1006 and providing OVERFLOW.

In some embodiments, each instance of modulo circuit 402A and modulo circuit 402B can be implemented using the same set of digital logic. In such case, each instance of the modulo circuit can include an input for LAST and a multiplexer having its output coupled to the second input (1) of multiplexer 1006. The data inputs of this additional multiplexer can be the don't care code and the output of subtractor 102. The control input of the additional multiplexer can receive LAST.

In embodiments, each modulo circuit 402 can be implemented using combinational digital logic, for example, as shown in FIGS. 10A-B and described above. An integer divider requires sequential digital logic and the use of storage circuits (e.g., flip-flops) that require clock signals. Performing a modulo operation using an integer divider and remainder calculator requires more complex digital logic than the combinational digital logic described above for the modulo circuits. Further, the combinational logic of the modulo circuits requires less IC implementation area and does not require clocking. In addition, the combinational logic of the modulo circuits scales with higher group sizes.

Figure 11:
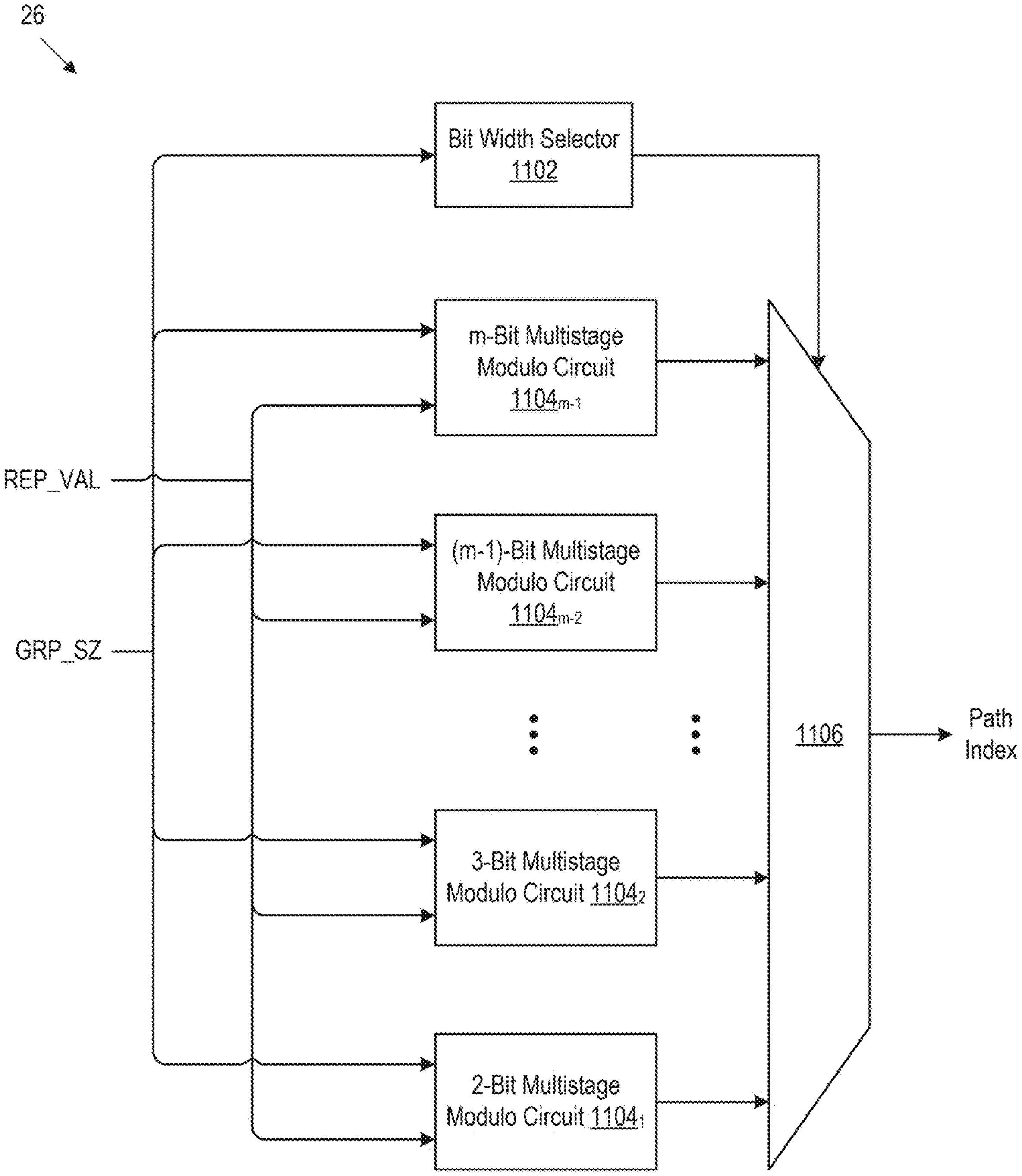
FIG. 11 is a block diagram depicting a path index generator according to further embodiments.

FIG. 11 is a block diagram depicting path index generator 26 according to further embodiments. As shown in FIG. 11, path index generator 26 can include a set of multistage modulo circuits $\mathbf{1104}_1 \ldots \mathbf{1104}_{m-1}$, where m is a positive integer. Multistage modulo circuit $\mathbf{1104}_1$ can process REP_VAL and GRP_SZ codes comprising 2 bits (e.g., M=2). Multistage modulo circuit 11042 can process REP_VAL and GRP_SZ codes comprising 3 bits (e.g., M=3). In general, a kth multistage modulo circuit 1104*k* (k∈[1 . . . m−1]) can process REP_VAL and GRP_SZ codes comprising (k+1) bits. Each multistage modulo circuit $\mathbf{1104}_1 \ldots \mathbf{1104}_{m-1}$ can include N stages, e.g., as shown in FIG. 8. The number N stages for each multistage modulo circuit $\mathbf{1104}_1 \ldots \mathbf{1104}_{m-1}$ can be the same or different from other multistage modulo circuits.

The inputs of multistage modulo circuits $\mathbf{1104}_1 \ldots \mathbf{1104}_{m-1}$ can receive N REP_VAL codes (depending on the number of stages in a given multistage modulo circuit) and the GRP_SZ code. Data inputs of multiplexer 1106 can be coupled to the outputs of multistage modulo circuits $\mathbf{1104}_1 \ldots \mathbf{1104}_{m-1}$. The data output of multiplexer 1106 supplies the path index. Path index generator 26 shown in FIG. 11 can include a bit width selector circuit 1102 having an input that receives the GRP_SZ code. Based on the most significant bit (MSB) of the GRP_SZ code, bit width selector 1102 can generate an output, coupled to the control input of multiplexer 1106, that controls multiplexer 1106 to select one of the data inputs. This circuit configuration shown in FIG. 11 allows path index generator 26 to accommodate different bit widths (M) for different group sizes. In the embodiment shown, the bit widths of the multistage modulo circuits are shown as being sequential from 2 bits to m bits. In other embodiments, the bit widths of the multistage modulo circuits are not sequential (e.g., 5, 9, 17, 22, 65, etc. or any other set of bit widths).

Figure 12:
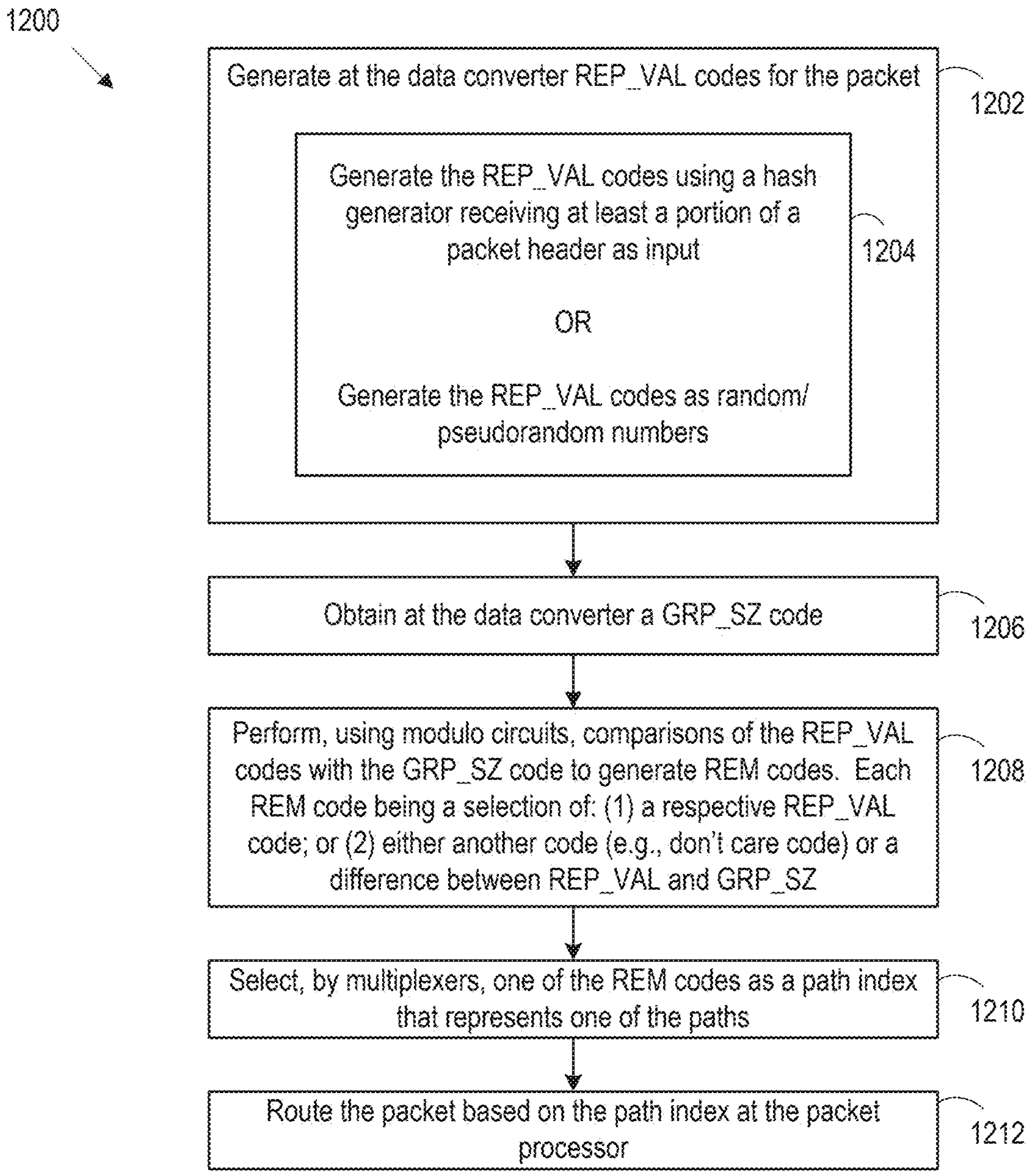
FIG. 12 is a flow diagram depicting a method of routing a packet in a network device according to embodiments.

FIG. 12 is a flow diagram depicting a method 1200 of routing a packet in a network device according to embodiments. Method 1200 begins at step 1202, where data converter 27 can generate REP_VAL codes for the packet. For example, at step 1204, data converter 27 can generate the REP_VAL codes using a hash generator that generates a hash value using at least a portion of a packet header as input. The REP_VAL codes can be portions of the hash value. Alternatively, data converter 27 can generate a random or pseudorandom value and the REP_VAL codes can be portions of the random/pseudorandom value. The number of REP_VAL codes generated can be dictated by a number (N) of stages in path index generator 26. The bit width of the REP_VAL codes can be dictated by the bit width of the GRP_SZ code, which in turn can be dictated by the number of alternative paths from which paths are being selected. In embodiments, a bit width of GRP_SZ can be M bits and a bit width of the hash/random/pseudorandom value generated by data converter 27 can be N*M bits such that N REP_VAL codes can be derived each having M-bits. In embodiments where path index generator 26 includes multiple multistage modulo circuits with different numbers of stages (e.g., FIG. 11), the number of REP_VAL codes generated can be dictated by the maximum N ($N_{MAX}$) of the multistage modulo circuits. REP_VAL codes that are unneeded by a given multistage modulo circuit can be ignored/unconnected.

At step 1206, data converter 27 obtains a GRP_SZ code. For example, data converter 27 can read a GRP_SZ code from memory 16. In embodiments, network device 100 can store multiple GRP_SZ codes, e.g., for different network destinations. That is, different network destinations can have different sets of alternative paths. In embodiments, the same network destination can also have different sets of alternative paths. Packet processor 10 supplies to data converter 27 in the request (REQ) the information needed to select the GRP_SZ code from memory 16.

At step 1208, path index generator 26 receives as first codes and a second code the REP_VAL codes and the GRP_SZ code. Path index generator 26 can perform, using instances of modulo circuit 402, comparisons of the REP_VAL codes with the GRP_SZ code to generate remainder (REM) codes. Each REM code can be either: (1) a selection of a respective REP_VAL code; or (2) either a don't care code or the difference between a respective REP_VAL code and the GRP_SZ code, depending on which modulo circuit 402A or 402B. In embodiments, path index generator 26 includes N instances of modulo circuit 402 (e.g., $\mathbf{402}_1 \ldots \mathbf{402}_N$ as shown in FIG. 8). Each instance of modulo circuit $\mathbf{402}_1 \ldots \mathbf{402}_N$ can receive a respective one of the N REP_VAL codes. Each instance of modulo circuit $\mathbf{402}_1 \ldots \mathbf{402}_N$ can correspond with a stage of path index generator 26 (e.g., path index generator 26 can include N stages). In some embodiments, path index generator 26 can include multiple multistage modulo circuits (e.g., FIG. 11), where each multistage modulo circuits includes some number of instances of modulo circuit 402. Each instance of modulo circuit 402 can include combinational digital logic. The modulo circuits can perform the comparisons using comparators. The modulo circuits can perform the differences using subtractors, which can be implemented using parallel subtractor circuits or parallel adder circuits. The modulo circuits can perform selection using multiplexers.

At step 1210, path index generator 26 selects, by multiplexers, one of the REM codes generated by the modulo circuits as the path index that represents one of the paths (e.g., a path selected from the set of alternative paths). Given the first codes of the REP_VAL codes, and the second code of the GRP_SZ code, path index generator 26 outputs a third code being the selected one of the REM codes, e.g., the path index. The modulo circuits can be a set of first circuits and the multiplexers can form a second circuit that selects the output of one of the modulo circuits. The multiplexers of this second circuit can be controlled using the OVERFLOW outputs of the modulo circuits (e.g., FIG. 8).

At step 1212, packet processor 10 can route a packet or packets based on the path index returned by multipath load balancer 12. Method 1200 can be repeated for each packet or each set of packets being routed to the same or different network destinations. Data converter 27 can generate as output REP_VAL codes and a GRP_SZ code for each cycle of a clock in response to each request (REQ) from packet processor 10. The combinational digital logic of path index generator 26 can evaluate the input and generate a path index in a single cycle of the clock.

As used herein, the phrase "at least one of" preceding a series of items, with the term "and" or "or" to separate any of the items, modifies the list as a whole rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

As used herein, the term "couple" and its derivatives include: (a) electrical and communicative coupling; and (b) do not imply a direct connection, but rather may include intervening elements, unless described as "directly coupled."

The techniques herein have been described, at least in part, in terms of one or more embodiments. An embodiment is used herein to illustrate a technique or techniques, an aspect thereof, a feature thereof, a concept thereof, and/or an example thereof. A physical embodiment of an apparatus, an article of manufacture, a machine, and/or of a process that embodies the techniques may include one or more of the aspects, features, concepts, examples, etc. described with reference to one or more of the embodiments discussed herein. Although one or more embodiments have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. An apparatus for a network device, comprising:

first logic configured to generate first codes for a packet, and receive a second code that represents a number of paths through a network between the network device and a destination of the packet;

first circuits, coupled to the first logic, each including a comparator configured to perform a comparison of one of the first codes with the second code, each configured to provide an output depending on the comparison; and a second circuit, coupled to the first logic and the first circuits, configured to select the output of one of the first circuits as a third code that represents one of the paths, the second circuit comprising first multiplexers, each of the first multiplexers coupled to the output of one of the first circuits and the output of the comparator of one of the first circuits.

2. The apparatus of claim 1, wherein the second circuit comprises a second multiplexer coupled to the output of a first one of a pair of the first circuits, the output of a second one of the pair of first circuits, and the output of the comparator of the first one of the pair of first circuits.

3. The apparatus of claim 1, wherein an output of one of the first multiplexers supplies the third code.

4. The apparatus of claim 1, wherein each of the first circuits includes a multiplexer configured to perform a selection in response to the output of the comparator.

5. The apparatus of claim 4, wherein the multiplexer in each of the first circuits is configured to select between the one of the first codes or a fourth code.

6. A network device, comprising:

a packet processor configured to receive a packet;

first logic, coupled to the packet processor, configured to generate first codes for the packet, receive from a memory a second code that represents a number of paths through a network between the network device and a destination, and provide a third code that represents one of the paths to the packet processor;

first circuits, coupled to the first logic, each including a comparator configured to perform a comparison of one of the first codes with the second code, each configured to provide an output depending on the comparison; and a second circuit, coupled to the first logic and the first circuits, configured to select the output of one of the first circuits as the third code, the second circuit comprising first multiplexers, each of the first multiplexers coupled to the output of one of the first circuits and the output of the comparator of the one of the first circuits.

7. The network device of claim 6, wherein the first logic includes second logic configured to receive as an input at least a portion of the packet and generate the first codes from a hash of the input.

8. The network device of claim 6, wherein the second circuit comprises a second multiplexer coupled to the output of a first one of a pair of the first circuits, the output of a second one of the pair of first circuits, and the output of the comparator of the first one of the pair of first circuits.

9. The network device of claim 6, wherein each of the first circuits includes a multiplexer configured to perform a selection in response to the output of the comparator.

10. The network device of claim 9, wherein the multiplexer in each of the first circuits is configured to select between the one of the first codes or a fourth code.

11. A method of routing a packet in a network device, comprising:

generating, at first logic, first codes for the packet;

receiving, at the first logic from a memory, a second code that represents a number of paths through a network between the network device and a destination;

performing, by first circuits, comparisons of the first codes with the second code using respective comparators and generate outputs in response to the comparisons, each of the outputs being a selection of one of the first codes or another code;

selecting, by a second circuit, one of the outputs as a third code that represents one of the paths, the second circuit comprising first multiplexers, the step of selecting comprising controlling the first multiplexers using the outputs of the comparators to select the one of the outputs of the first circuits as the third code; and routing, by a packet processor, the packet based on the third code.

12. The method of claim 11, wherein the step of generating comprises:

receiving, as input to second logic, at least a portion of the packet; and generating, by the second logic, the first codes as a hash of the input.

13. The method of claim 11, wherein each of the first circuits includes a multiplexer, and wherein the step of performing comprises:

performing, by the multiplexer of each of the first circuits, a selection based on the output of the comparator to generate a respective one of the outputs.

14. The method of claim 13, wherein the selection for the multiplexer of each of the first circuits is between one of the first codes and the other code.

* * * * *